350-469

OR 3,517,986

June 30, 1970    F. SCHLEGEL    3,517,986

WIDE ANGLE OBJECTIVE SYSTEM

Filed June 4, 1968

INVENTOR

Franz Schlegel

United States Patent Office 3,517,986
Patented June 30, 1970

3,517,986
WIDE ANGLE OBJECTIVE SYSTEM
Franz Schlegel, Munich, Germany, assignor to Optische Werke G. Rodenstock, Munich, Germany
Filed June 4, 1968, Ser. No. 734,290
Claims priority, application Germany, Nov. 28, 1967, O 12,910
Int. Cl. G02b 9/34
U.S. Cl. 350—220          1 Claim

ABSTRACT OF THE DISCLOSURE

A wide angle objective system covering an angular field of at least 90° and having a relative aperture of at least 1:5.6 which is basically symmetrical and has outer, meniscus-shaped, negative elements air-spaced from cemented triplets on either side on the diaphragm. Zonal aberration can be held to as little as 4 parts per thousand.

---

This invention relates to wide angle objective systems, and particularly to a wide angle objective system of the symmetrical type having outer, meniscus-shaped elements of negative power.

Wide angle objectives were originally designed to be perfectly symmetrical, and such objectives are free from coma and aberration due to asymmetry for a scale of reproduction of 1:1.

However, wide angle objectives are mainly employed for producing images of objects located at a great distance so that they must be corrected for reproducing infinitely remote objects in the focal plane of the image space. Asymmertical features were therefore introduced into the objectives in order to compensate for the aberration due to asymmetry, and particularly for zonal aberration.

The deviations from symmetry in some such known objectives may extend to the number and arrangement of the lenses. It has been found, however, that new sources of aberration are introduced by wide deviations from the basic symmetrical arrangement, and that it becomes necessary to balance sources of aberration in the lens ahead of and behind the diaphragm.

It has now been found that a wide angle objective system covering an angular field of 90° at a relative aperture of 1:5.6 may have two halves which are almost entirely symmetrical as to the number of lenses and of cemented interfaces between elements of compound lenses, and the general shape of the elements if only minor variations are made in the radii of curvature and in the types of glasses used, as to the indices of refraction and Abbe numbers of the latter.

Figure 1:
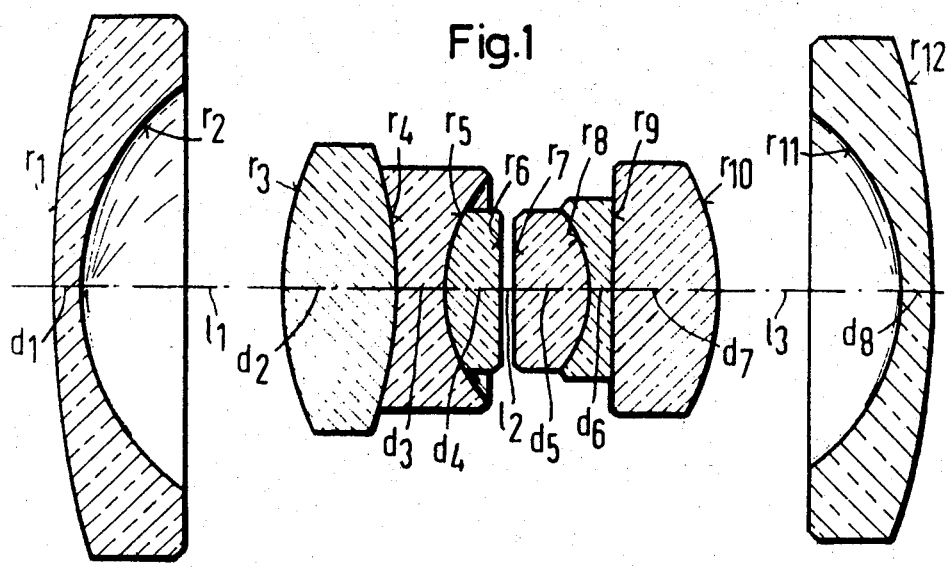
Figure 2:
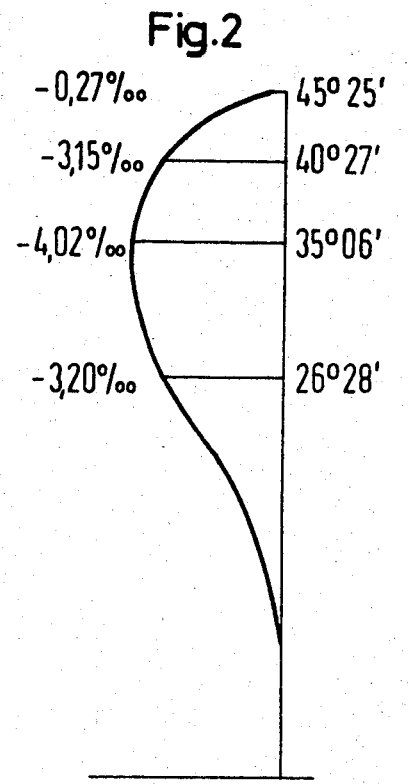

FIG. 1 shows a wide angle objective system of the invention in a conventional view at right angles to its axis; and FIG. 2 is a plot of zonal aberration versus angular spacing from the optical axis in the objective of FIG. 1.

The objective system illutsrated in FIG. 1 consists of two outer, meniscus-shaped simple elements of negative power and two inner cemented triplets air-spaced from the outer elements near the diaphragm space. The objective system has the following radii of curvature $r$, thicknesses $d$, air spacings $l$, indices of refraction $n_e$, and Abbe number $v_e$:

| | | $n_e/v_e$ |
|---|---|---|
| $r_1 = +152.8$ | $d_1 = 3.83$ | 1.489/70.2 |
| $r_2 = +37.85$ | $l_1 = 31.4$ | |
| $r_3 = +51.40$ | $d_2 = 18.03$ | 1.716/53.6 |
| $r_4 = -70.25$ | $d_3 = 7.90$ | 1.617/44.1 |
| $r_5 = +26.12$ | $d_4 = 9.56$ | 1.543/46.9 |
| $r_6 = -1672$ | $l_2 = 1.78 + 1.79$ | |
| $r_7 = -181.6$ | $d_5 = 11.45$ | 1.520/64.9 |
| $r_8 = -18.55$ | $d_6 = 3.44$ | 1.617/44.1 |
| $r_9 = +335$ | $d_7 = 16.65$ | 1.716/53.6 |
| $r_{10} = -44.5$ | $l_3 = 29.2$ | |
| $r_{11} = -34.1$ | $d_8 = 5.07$ | 1.472/67.1 |
| $r_{12} = -127.6$ | | |

The values of radii, thicknesses, and air spacing are based on a focal length of 100 in the same units of length. The objective has an angular field of 90° and a relative aperture of 1.56. Its back focus is 57.0 in the aforementioned units of length.

FIG. 2 shows its zonal aberration in parts per thousand (‰) at various field angles relative to the optical axis. The maximum value of zonal aberration is reached at 4.02‰, and zonal aberration approaches zero at the edge of a field of 90°.

The high quality of the illustrated objective will best be appreciated when considering that zonal aberration values of 8‰ are commercially acceptable in objectives of this type.

An angular field of more than 90° may be utilized with the objective of the invention at a somewhat reduced relative aperture without exceeding the aforementioned limit of zonal aberration.

The chromatic aberration of the objective illustrated is of the order of a few parts per ten thousand, and are thus not noticeable unless the focal length of the objective system is unusually great.

What is claimed is:

1. A photographic wide angle objective system having two outer, meniscus-shaped elements of negative power and two inner cemented triplets air-spaced from said outer elements and each other, the zonal aberration of said objective being less than 5 parts per thousand over an angular field of 90° at a relative aperture of at least 1:5.6, the radii of curvature $r$, thicknesses $d$, and air spacings $l$ of the glasses of said objective in units in which the focal length of the objective is 100, the indices of refaction $n_e$ and the Abbe numbers $v_e$ of the glasses being substantially as follows:

|  |  | $n_e/v_e$ |
|---|---|---|
| $r_1 = +152.8$ | $d_1 = 3.83$ | 1.489/70.2 |
| $r_2 = +37.85$ | $l_1 = 31.4$ |  |
| $r_3 = +51.40$ | $d_2 = 18.03$ | 1.716/53.6 |
| $r_4 = -70.25$ | $d_3 = 7.90$ | 1.617/44.1 |
| $r_5 = +26.12$ | $d_4 = 9.56$ | 1.543/46.9 |
| $r_6 = -1672$ | $l_2 = 1.78 + 1.79$ |  |
| $r_7 = -181.6$ | $d_5 = 11.45$ | 1.520/64.9 |
| $r_8 = -18.55$ | $d_6 = 3.44$ | 1.617/44.1 |
| $r_9 = +335$ | $d_7 = 16.65$ | 1.716/53.6 |
| $r_{10} = -44.5$ | $l_3 = 29.2$ |  |
| $r_{11} = -34.1$ | $d_8 = 5.07$ | 1.472/67.1 |
| $r_{12} = -127.6$ |  |  |

References Cited

UNITED STATES PATENTS 3,447,861   6/1969   Schlegel _____ 350—220

JOHN K. CORBIN, Primary Examiner

U.S. Cl. X.R.

350—177